United States Patent [19]

Nakamura

[11] Patent Number: 5,392,366
[45] Date of Patent: Feb. 21, 1995

[54] PATTERN RECOGNITION APPARATUS

[75] Inventor: Yoshikatu Nakamura, Yokosuka, Japan

[73] Assignee: Kabushiki Kaisha Toshiba, Kawasaki, Japan

[21] Appl. No.: 841,326

[22] Filed: Feb. 25, 1992

[30] Foreign Application Priority Data

Feb. 28, 1991 [JP] Japan .................. 3-034721
Dec. 17, 1991 [JP] Japan .................. 3-333420

[51] Int. Cl.⁶ .............................. G06K 9/62
[52] U.S. Cl. ........................ 382/30; 382/134
[58] Field of Search .............. 382/30, 34, 33, 41, 382/49, 39; G06K 9/62, 9/64, 9/68, 9/74, 9/36, 9/54, 9/60

[56] References Cited

U.S. PATENT DOCUMENTS 4,843,567  6/1989  Mukherjee ............... 382/39
5,014,327  5/1991  Potter ..................... 382/30

FOREIGN PATENT DOCUMENTS 0431890  6/1991  European Pat. Off. .
3513429  10/1986  Germany .
1354040  5/1974  United Kingdom .
2098773  11/1982  United Kingdom .
2187586  9/1987  United Kingdom .

OTHER PUBLICATIONS

H. Wedekind, "Datenorganisation", Walter de Gruyter & Co., Berlin, 1970, pp. 128/129.
National Convention Record, 1985, The Institute of Electronics and Communication Engineers of Japan part 6, No. 1547; Y. Nakamura et al., Mar. 28, 1985.

*Primary Examiner*—Yon J. Couso
*Attorney, Agent, or Firm*—Cushman, Darby & Cushman

[57] ABSTRACT

In a pattern recognition apparatus constituted by a one-chip LSI (large scale integrated), product-sum calculations are performed between an input pattern to be recognized and a plurality of reference patterns by a product-sum circuit. The plurality of reference patterns are stored in an external memory used as a dictionary. The similarity values obtained by the product-sum calculations are subjected to floating processing in a floating circuit. The similarity values, which have undergone floating processing, are sorted in the order of larger magnitudes. The sorted similarity values are read out by a host CPU (central processing unit).

6 Claims, 15 Drawing Sheets

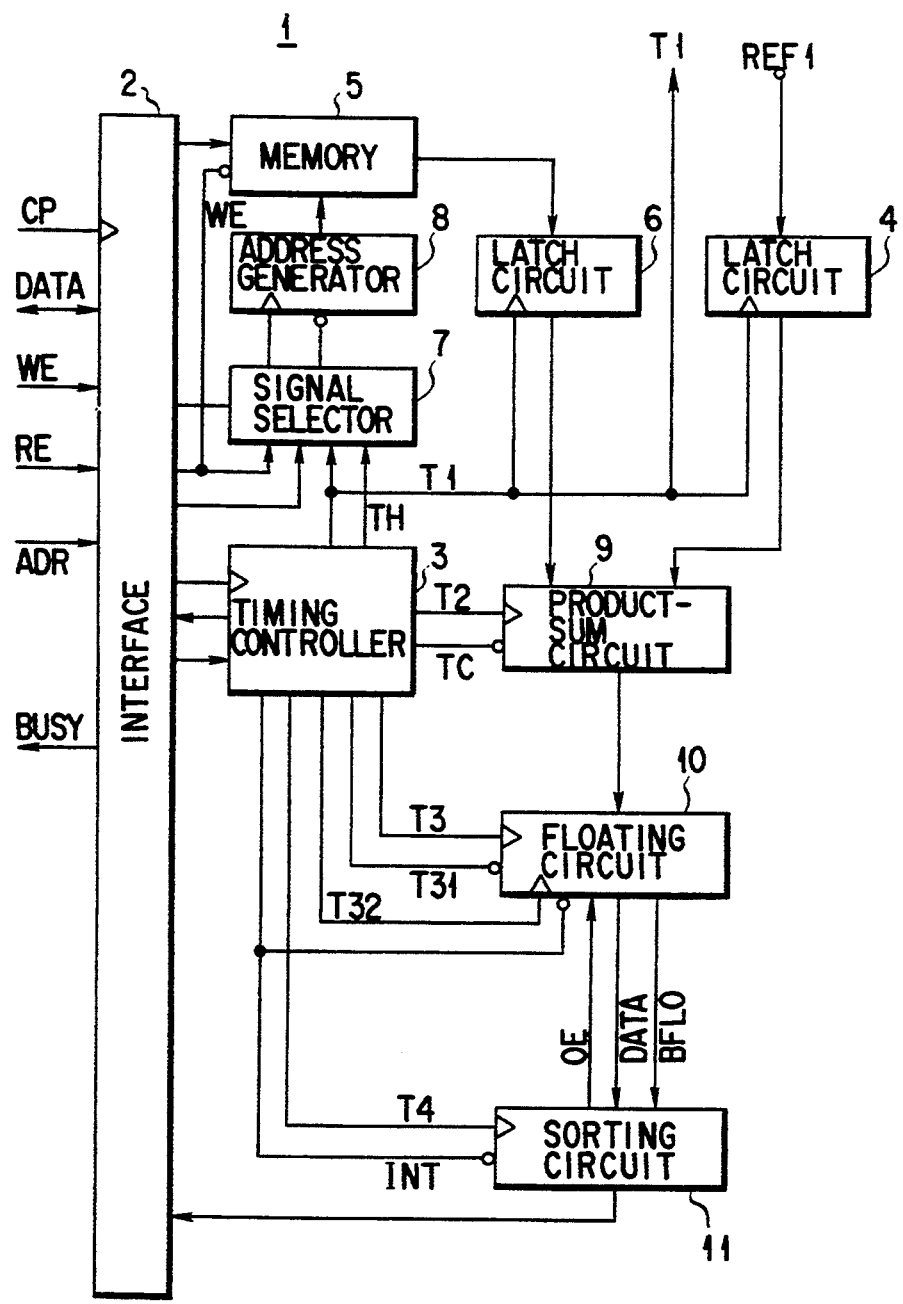
F I G. 1

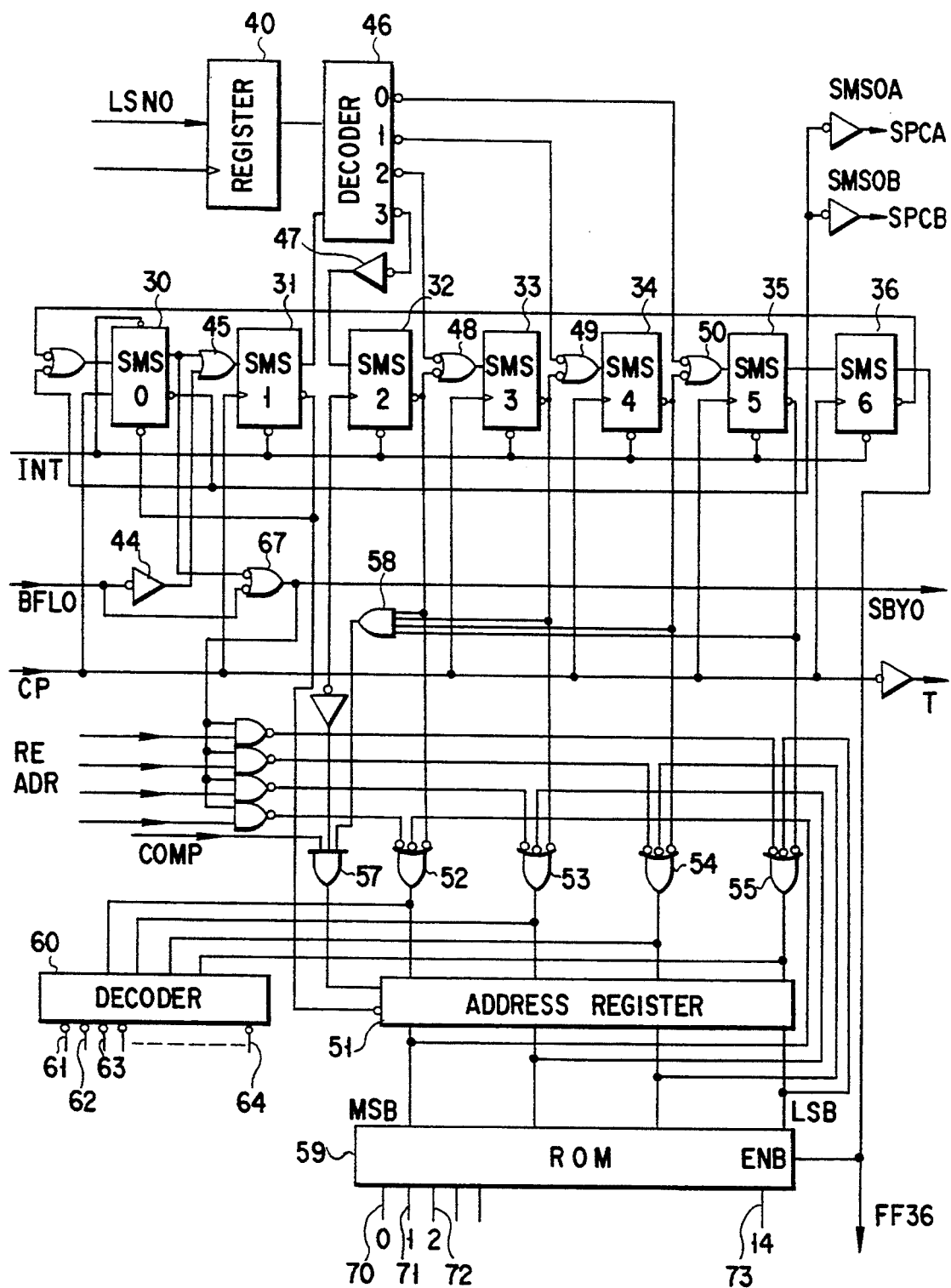
F I G. 6A

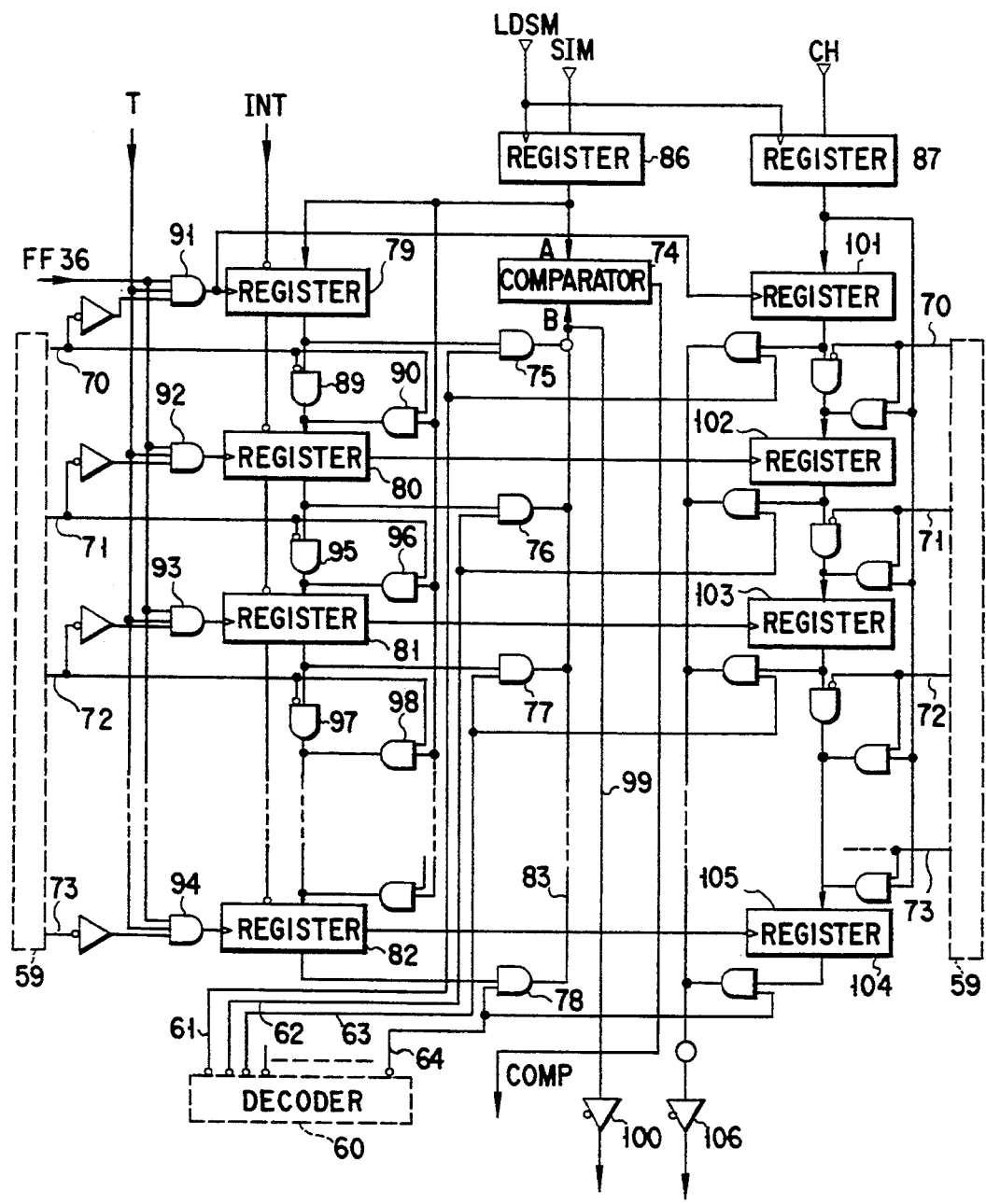
F I G. 6B

| CANDIDATE NUMBER | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| POSITIVE LOGICAL DATA | 1 | 1 | 1 | 1 | 1 | 0 | 0 | 0 | 0 | 0 | 0 | 0 | 0 | 0 | 0 |
| | | UNLOAD | | | | | | LOAD | | | | | | | |
| NEGATIVE LOGICAL DATA | 1 | 1 | 1 | 1 | 1 | 1 | 0 | 0 | 0 | 0 | 0 | 0 | 0 | 0 | 0 |
| | | SIM SET | | | | | | SIM SHIFT | | | | | | | |

SIM INPUT

F I G. 7

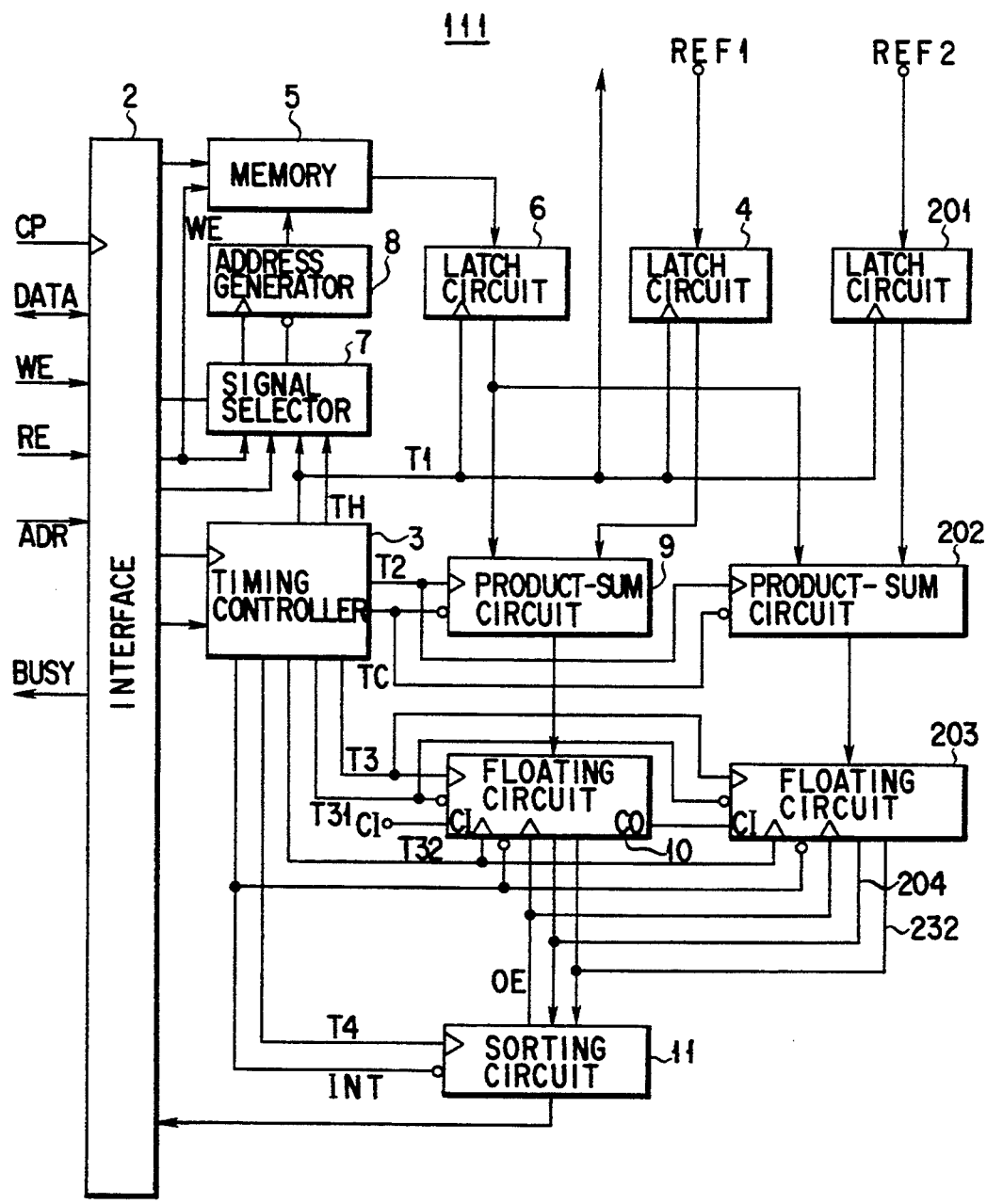
F I G. 8

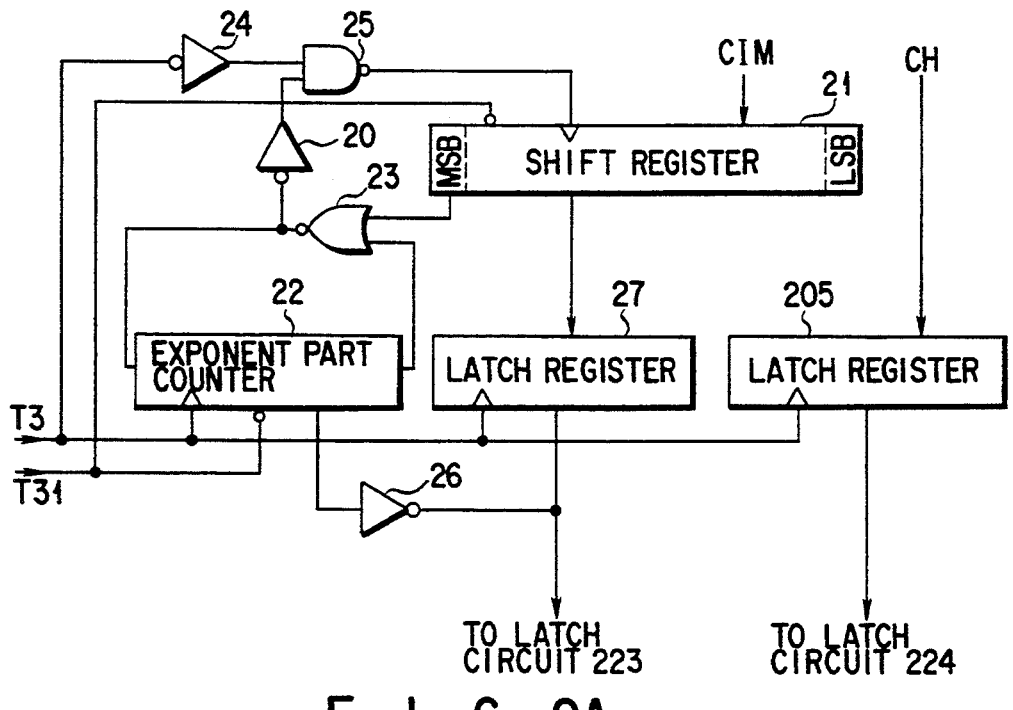
F I G. 9A
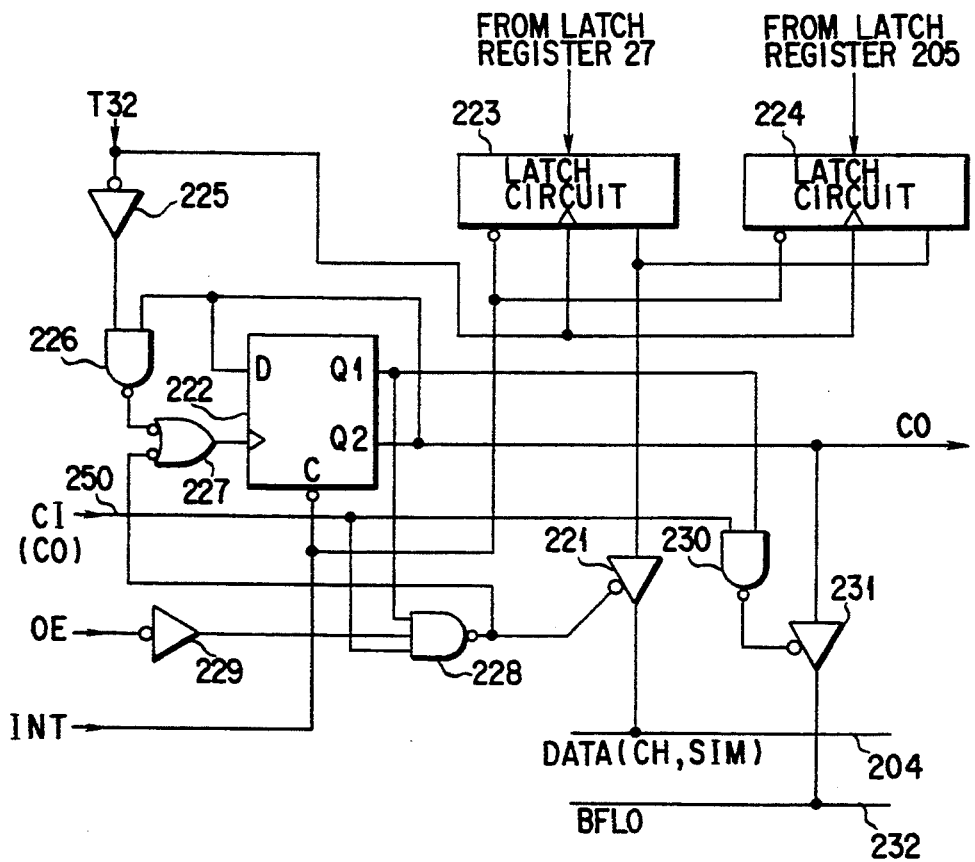
F I G. 9B

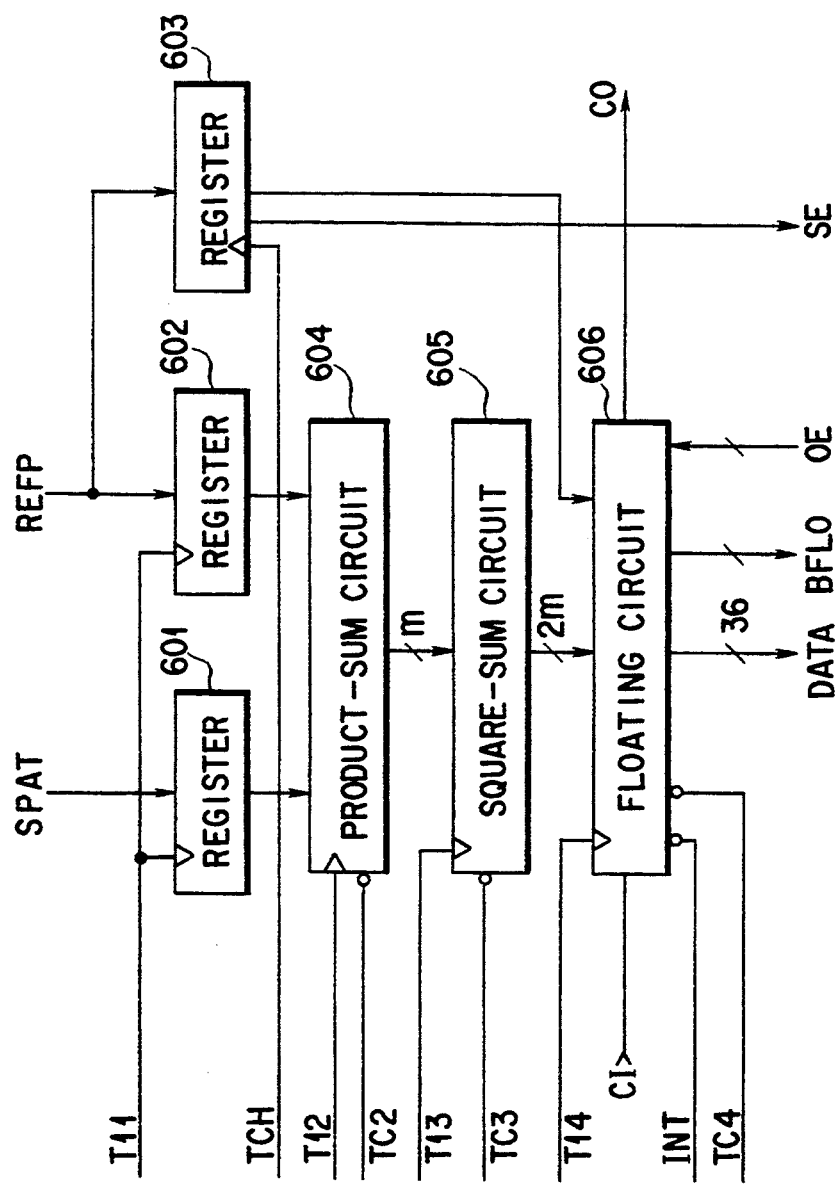
F I G. 11

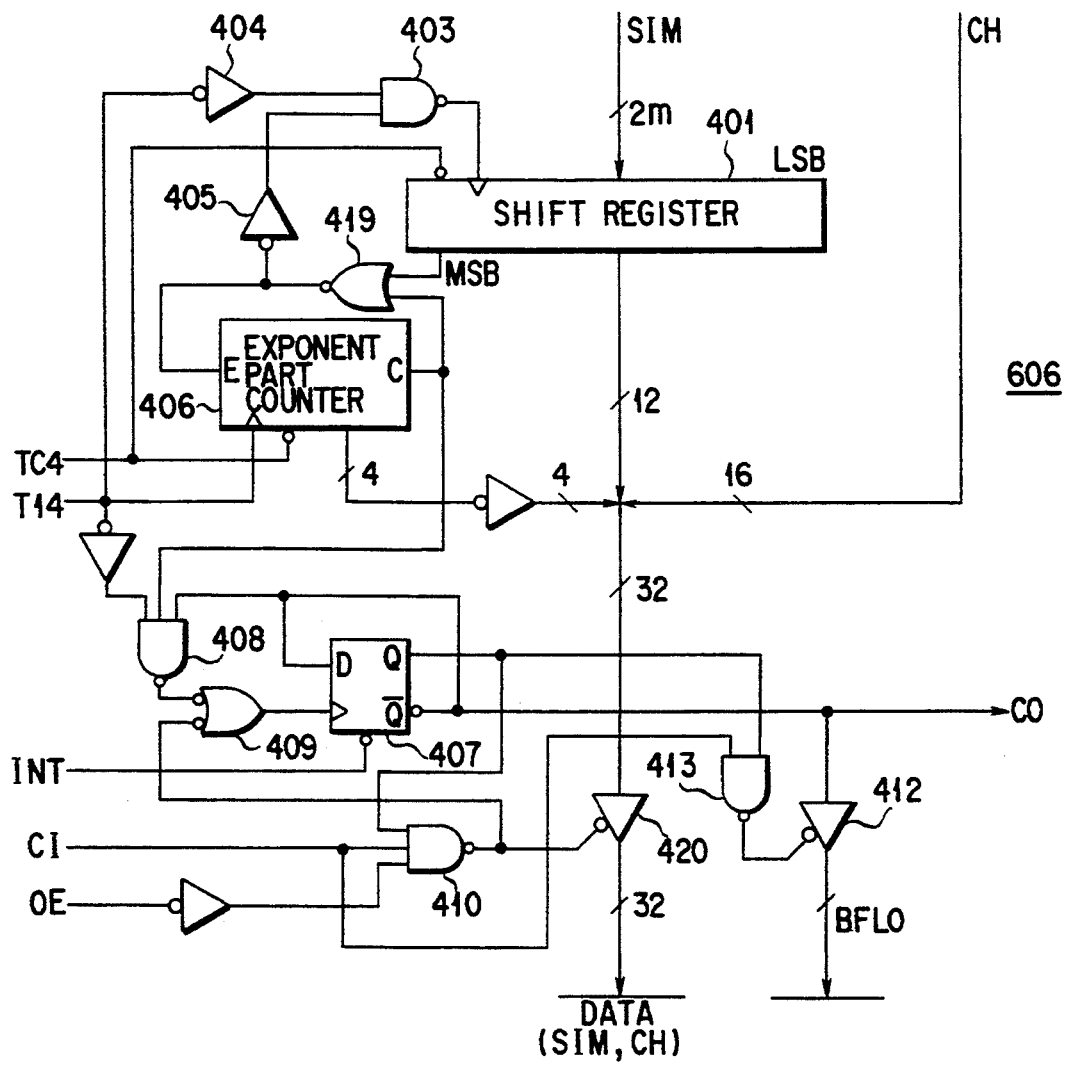
F I G. 13

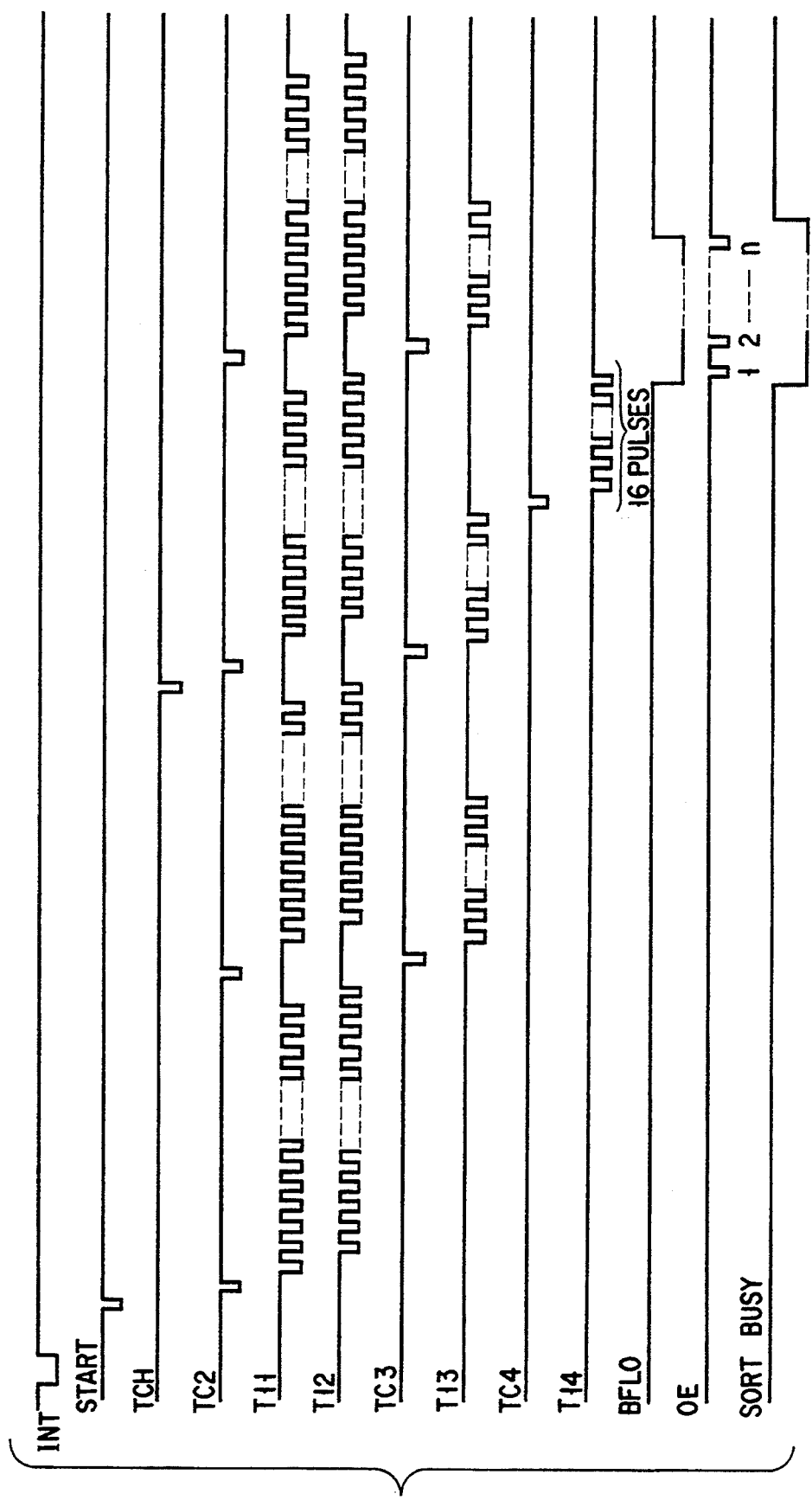
F I G. 15

PATTERN RECOGNITION APPARATUS

Background of the Invention

1. Field of the Invention

The present invention relates to a pattern recognition apparatus.

2. Description of the Related Art

In a conventional pattern recognition apparatus, e.g., an optical character reader, a character image to be recognized is extracted, as an input pattern, from an object observed by an optical method, and the similarity, difference, or the like between the extracted input pattern and each preset reference pattern is calculated for category division. With this calculation, a category of a reference pattern most similar to the input pattern is acquired as a recognition result. In a speech recognition apparatus or the like, similar processing is performed.

In such recognition processing, the above-mentioned calculation, i.e., a product-sum calculation or the like between an input pattern and a reference pattern must be performed at high speed. In order to perform high-speed calculations, a discrete logic circuit, a ROM table, or the like, has been used. If recognition targets are a numeral, an alphabetic character, a kana character, etc., recognition processing requires only a small number of calculations. Therefore, a practical processing speed can be ensured.

In a conventional optical character reader, however, if various types of characters including kanji characters and the like are to be recognized as recognition targets, or in a speech recognition apparatus, if continuous speech is to be recognized as a recognition target, a very complicated circuit arrangement is required. This results in an expensive apparatus. In addition, the reliability of the apparatus deteriorates.

Furthermore, in a conventional apparatus, when high data precision is required, as in recognition of kanji characters and the like, similarity calculation results are not normalized because floating processing is not performed. For this reason, the sorting processing speed is decreased, and a large sorting circuit is required. In addition, as recognition processing proceeds from recognition of numerals, kana characters, and the like to recognition of kanji characters, higher data precision is required. Therefore, it is difficult to obtain a practical processing speed by using a conventional pattern recognition apparatus. Moreover, when sorting is to be performed by a host CPU, parallel processing of similarity calculations is limited, resulting in a decrease in processing speed.

Under the circumstances, demands have arisen for a compact pattern recognition apparatus capable of performing recognition at a practical speed even in recognition processing requiring high data precision.

SUMMARY OF THE INVENTION

It is an object of the present invention to provide a pattern recognition apparatus.

According to the present invention, there is provided a pattern recognition apparatus for checking an input pattern as a pattern to be recognized with a plurality of reference patterns to be provided sequentially and recognizing the input pattern, comprising: storage means for storing the input pattern; receiving means for receiving the provided reference patterns; similarity calculating means for calculating a similarity between the input pattern stored in the storage means and each of the reference patterns received by the receiving means to acquire similarity values; and sorting means for placing the similarity values corresponding to the reference patterns acquired by the similarity calculating means in order of magnitude of the similarity value acquired by the similarity calculating means, wherein the storage means, the receiving means, the similarity calculating means, and the sorting means are mounted on a one-chip LSI.

In addition, according to the present invention, there is provided a pattern recognition apparatus for checking an input pattern as a pattern to be recognized with a plurality of reference patterns to be provided sequentially and recognizing the input pattern, comprising: storage means for storing the input pattern; receiving means for receiving the provided reference patterns; similarity calculating means for calculating a similarity between the input pattern stored in the storage means and each of the reference patterns received by the receiving means to acquire similarity values; floating operation means for floating-processing the similarity values corresponding to the reference patterns acquired by the similarity calculating means in an exponent indication; and sorting means for sorting the similarity values corresponding to the reference patterns floating-processed by the floating operation means in order of magnitude of the similarity values acquired by the similarity calculating means, wherein the sorting means includes a plurality of storage means for storing the sorted similarity values, and means for replacing between new similarity value of the reference pattern acquired by the similarity calculating means and the similarity values stored in the plurality of storage means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram showing the arrangement of a pattern recognition apparatus according to the first embodiment of the present invention;

FIGS. 6A and 6B are block diagrams showing the arrangement of the sorting circuit in FIG. 1;

FIG. 7 is a view for explaining an operation of each candidate register in a case wherein a new similarity value SIM is set in a predetermined candidate register in sorting processing;

FIG. 8 is a block diagram showing the arrangement of a pattern recognition apparatus according to the second embodiment of the present invention;

FIGS. 9A and 9B are block diagrams showing the arrangement of a floating circuit in FIGS. 8

FIG. 11 is a block diagram showing the arrangement of a similarity calculating circuit in FIG. 10;

FIG. 13 is a block diagram showing the arrangement of a floating circuit in FIG. 10;

FIG. 15 is a timing chart of various types of signals output from the timing controller in FIG. 10.

DETAILED DESCRIPTION OF THE PREFERRED EMBODIMENTS

Figure 2:
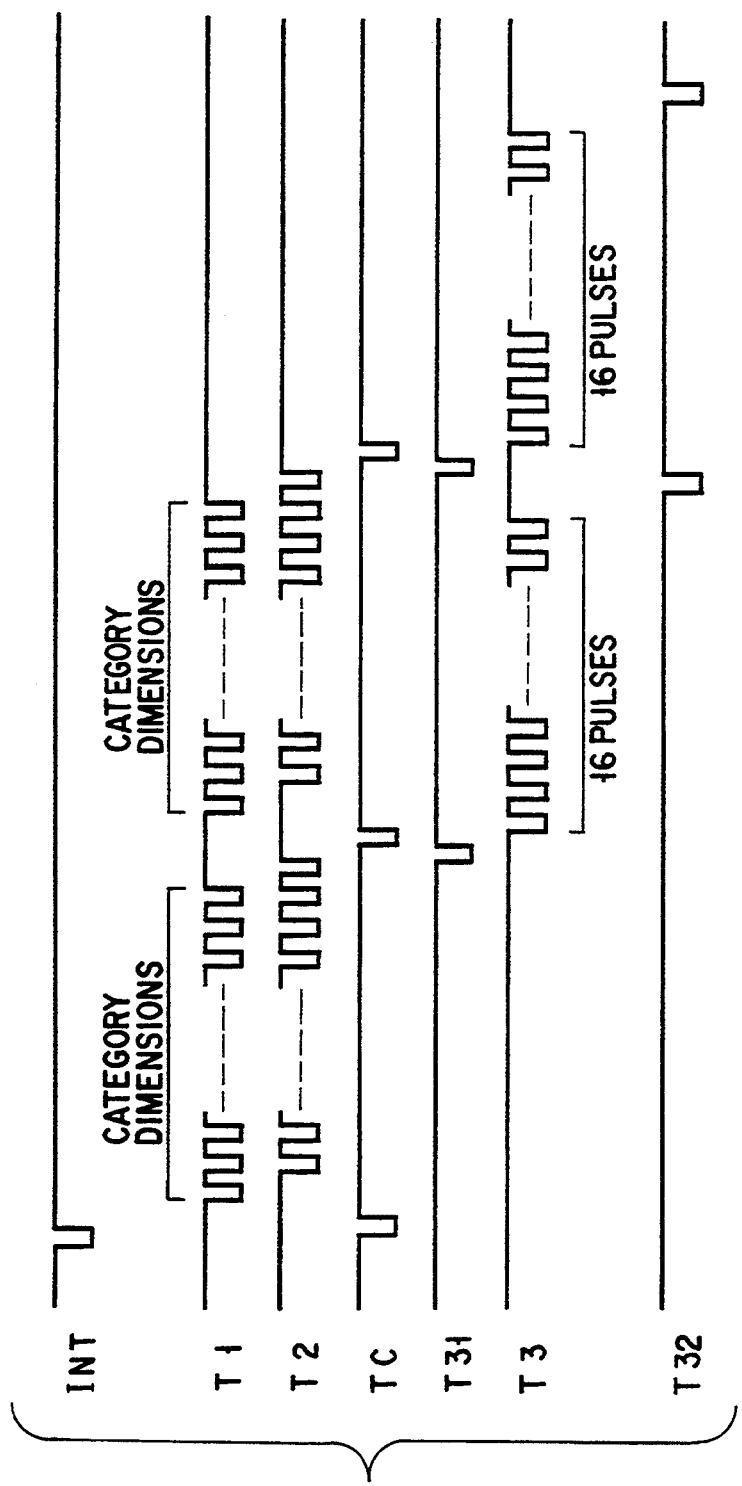
FIG. 2 is a timing chart of various types of signals output from a timing controller in FIG. 1.

Embodiments of the present invention will be described below with reference to the accompanying drawings.

FIG. 1 is a block diagram showing the arrangement of a pattern recognition apparatus according to the first embodiment of the present invention. A pattern recognition apparatus 1 shown in FIG. 1 is mounted on a one-chip LSI (large scale integrated) and constituted by an interface 2, a timing controller 3, latch circuits 4 and 6, a memory 5, a signal selector 7, an address generator 8, a product-sum circuit 9, a floating circuit 10, and a sorting circuit 11.

The interface 2 is connected to a host CPU (central processing unit (not shown)) to transmit/receive data to/from it. Note that a read command (RE), a write command (WE), and an address (ADR) are output from the host CPU. The timing controller 3 performs control for similarity calculations and the like, as will be described later. The latch circuit 4 latches a reference pattern read out from an external memory (not shown). That is, this external memory is used as a dictionary and serves to store various reference patterns. The memory 5 stores an input pattern from the interface 2. This input pattern is a pattern recognition target. The latch circuit 6 latches an input pattern read out from the memory 5. The signal selector 7 is controlled by the host CPU and used to supply one of signals, supplied from the interface 2 and the timing controller 3, to the address generator 8. The address generator 8 generates an address of the memory 5. The product-sum circuit 9 is used for similarity calculations and performs a product-sum calculation between the reference pattern and the input pattern respectively latched by the latch circuits 4 and 6. The floating circuit 10 performs floating processing with respect to the product-sum result obtained by the product-sum circuit 9. The sorting circuit 11 sorts a predetermined number of results of floating processing, performed by the floating circuit 10, in the order of larger similarity values.

An operation of the pattern recognition apparatus of the first embodiment will be described next.

Data representing the number of characters (number of categories) stored in the external memory as a dictionary, and the like are set in the timing controller 3 by the host CPU. Thereafter, a processing start signal is output from the host CPU to the pattern recognition apparatus 1. Upon reception of this processing start signal, the pattern recognition apparatus 1 outputs to a BUSY signal to the interface 2 till the similarity calculations between one input pattern and all the reference pattern are completed. The pattern recognition apparatus 1 also receives a reference pattern REF1 from the external memory which operates in synchronism with a clock signal CP. This reference pattern REF1 is latched by the latch circuit 4 in response to a timing signal T1 output from the timing controller 3. Note that the timing signal T1 is also used as an address increment signal for the external memory.

An input pattern output from the interface 2 is stored in the memory 5 as a pattern recognition target. This input pattern is latched by the latch circuit 6 in response to the timing signal T1 output from the timing controller 3. At the same time, the timing controller 3 outputs an address control signal to the address generator 8. In response to this signal, the address generated by the address generator 8 is incremented. The incremented address is output from the address generator 8 to the memory 5.

The input pattern is sequentially written in the memory 5 from address 0, generated by the address generator 8, with the same format as that of the reference pattern REF1. After address designation of the input pattern is performed, the reference pattern REF1 and its address are incremented in response to the timing signal T1 from the timing controller 3. As a result, the reference pattern REF1 and the input pattern are respectively input to the latch circuits 4 and 6.

The reference pattern REF1 and the input pattern inputted to the latch circuits 4 and 6, respectively, are output to the product-sum circuit 9. As shown in FIG. 2, the timing controller 3 generates an initialization signal TC in units of categories of the reference pattern REF1. After the contents of the product-sum circuit 9 are cleared in response to this initialization signal TC, a product-sum calculation between the input pattern and the reference pattern REF1 is performed in response to a timing signal T2 generated by the timing controller 3. Product-sum data representing the product-sum calculation result is output to the floating circuit 10. At this time, the contents of the product-sum circuit 9 are cleared in response to the initialization signal TC output from the timing controller 3. In addition, the timing controller 3 generates an initialization signal TH for initializing the address, of the memory 5, at which the input pattern is stored. This initialization signal TH is input to the address generator 8 through the signal selector 7. As a result, the address output from the address generator 8 becomes "0".

Figure 3A:
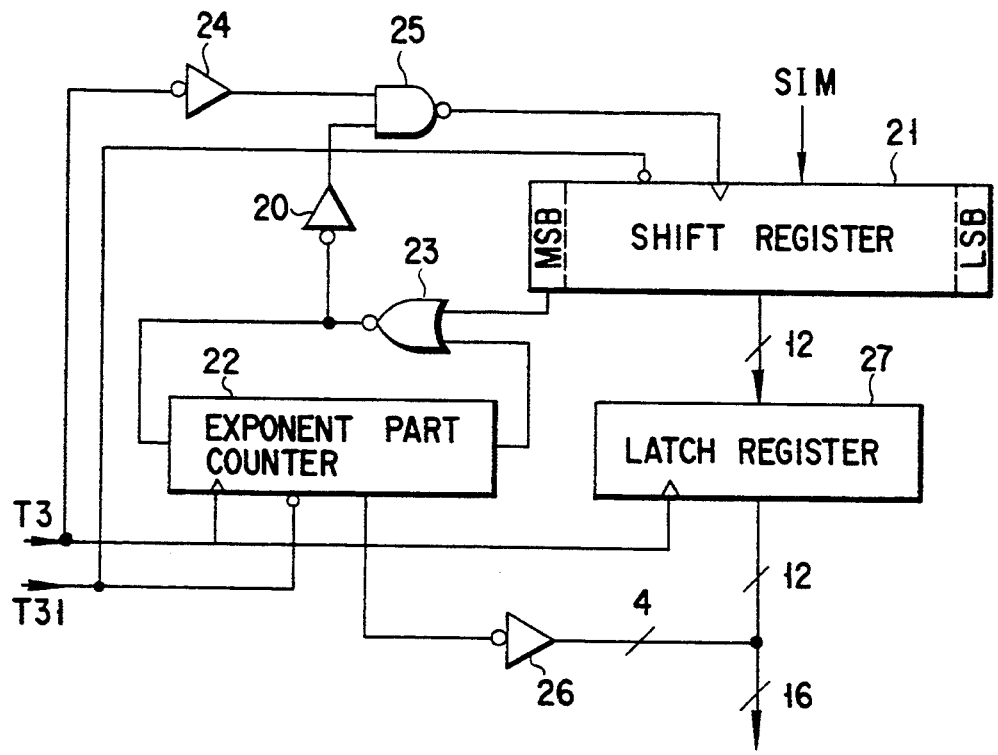
FIGS. 3A and 3B are block diagrams showing the arrangement of a floating circuit in FIG. 1.
Figure 3B:
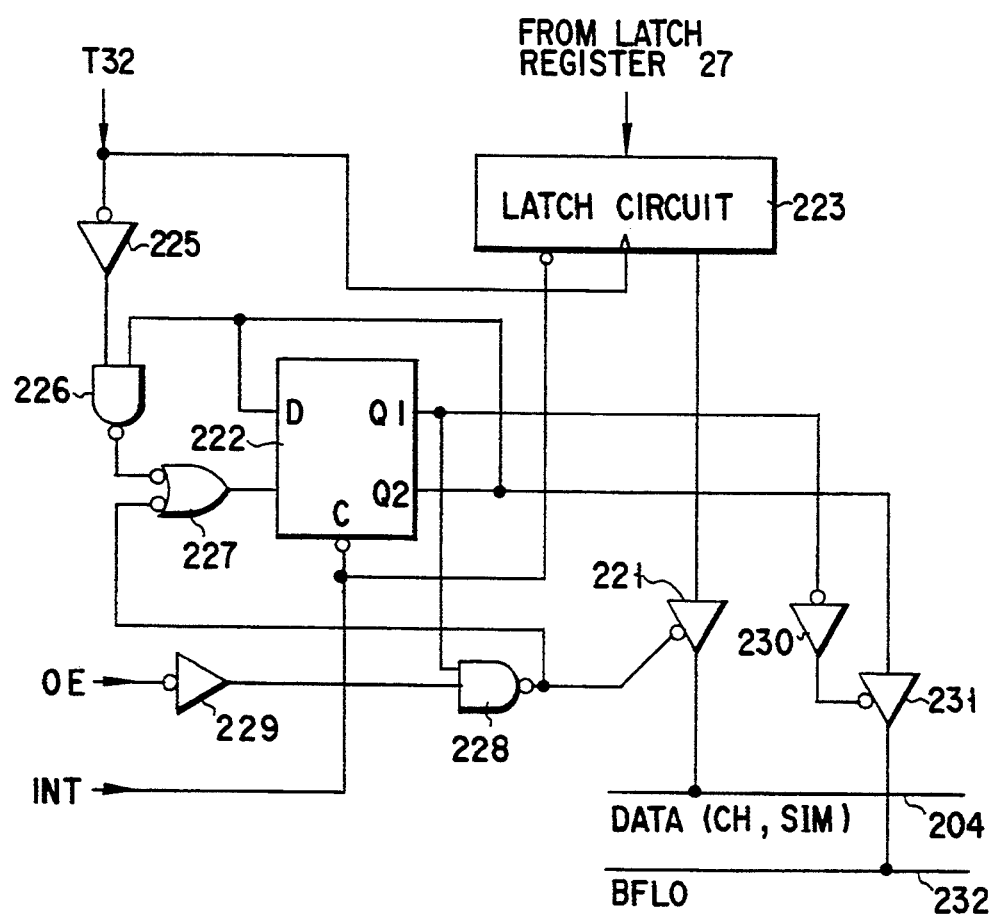

FIGS. 3A and 3B are block diagrams showing the arrangement of the floating circuit. An operation of the floating circuit will be described below with reference to FIGS. 3A and 3B.

The product-sum data (corresponding to a similarity value SIM) obtained by the product-sum circuit 9 is set in a shift register 21 in response to a load signal T31 output from the timing controller 3. At the same time, an exponent part counter 22 is initialized. A most significant bit (MSB) signal from the shift register 21 and a carry signal from the exponent part counter 22 are supplied to a gate 23. A timing signal T3 output from the timing controller 3 and a gate signal output from the gate 23 are supplied to a NAND gate 25 through inverters 24 and 20, respectively. An inverter 26 inverts the count value of the exponent part counter 22. A latch register 27 latches data in the shift register 21 in response to the timing signal T3.

After the data obtained by the product-sum circuit 9 is set in the shift register 21, the timing controller 3 outputs the timing signal T3, which has 16 continuous pulses as shown in FIG. 2, to the floating circuit 10. If the carry signal from the exponent part counter 22 or the MSB signal from the shift register 21 is "1", the gate signal from the gate 23 becomes "0", and the counting operation of the exponent part counter 22 is stopped.

Note that the shift operation of the shift register 21 is stopped by the exponent part counter 22 which determines the upper shift count limit of the shift register 21 when the value of data initially set in the shift register 21 is very small. This corresponds to a case wherein bits higher than the upper 15 bits of the data initially set in the shift register 21 are "0". In addition, if a carry occurs upon a shift operation of the shift register 21, or the MSB of the initially set data value is "1", the MSB of the shift register 21 is "1".

In general, as long as the MSB of a data value set in the shift register 21 is "0", a shift operation is performed. That is, a shift operation is performed by a number of "0" times corresponding to the number of bits continuously set from the MSB, and the shift count is used as exponent data. This exponent data is obtained by inverting the count value of the exponent part counter 22 using the inverter 26. Note that since the timing signal T3 has 16 pulses, as shown in FIG. 2, the upper shift count limit is 16. Therefore, the exponent data is constituted by 4 bits.

The data of the upper 12 bits of the shift register 21 is latched by the latch register 27 in response to the timing signal T3. The latched data is used as mantissa data. With this operation, normalized data is sorted by the sorting circuit 11.

Figure 4:
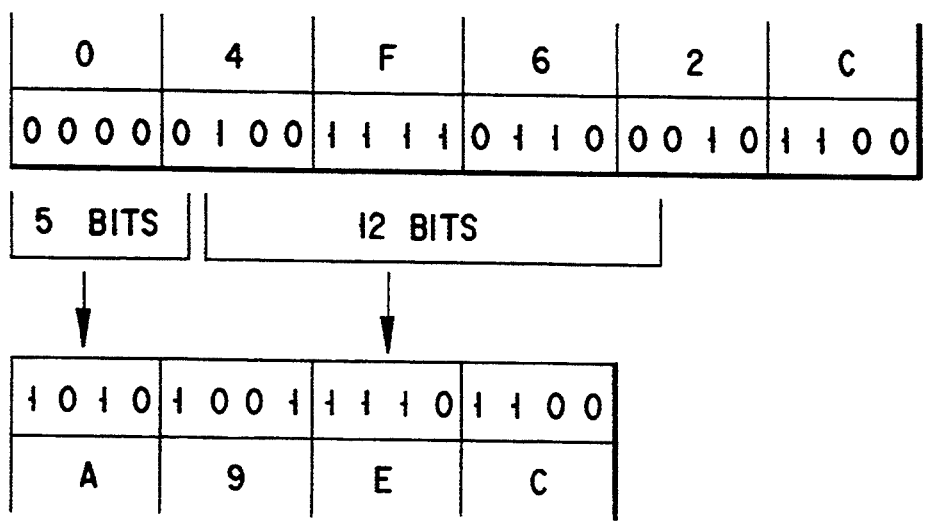
FIG. 4 is a view showing an example of data obtained by a shift operation performed by a shift register in the floating circuit in FIG. 1.

FIG. 4 shows data obtained by a shift operation of the shift register 21 described above. As shown in FIG. 4, if hexadecimal data "04F62" is set in the shift register 21, the number of bits "0" continuously set from the MSB is counted by the exponent part counter 22, and the data of the shift register 21 is shifted to the left by the count value corresponding to the number of bits "0". In this case, since the count value of the exponent part counter 22 is 5 ("0101" in binary notation), and this count value is expressed by a ones complement of the 4 bits, the count value is "A" in hexadecimal notation. In addition, the data of the upper 12 bits of the shift register 21, obtained after the shift operation, is "100111101100" in binary notation ("9EC" in hexadecimal notation). Therefore, the 16-bit data to be sorted is expressed by "A9EC" in hexadecimal notation.

The 16-bit data, which has undergone floating processing in the above-described manner, is latched by a latch circuit 223 in response to a timing signal T32. The 16-bit data latched by the latch circuit 223 is output to a data bus 204 through a gate 221. Note that an output from the gate 221 is controlled by a flip-flop 222. The flip-flop 222 is operated in response to the timing signal T32 input through a NAND gate 226 and a NOR gate 227. The timing signal T32 is generated immediately after the timing signal T3 is output from the timing controller 3.

The flip-flop 222 is reset by a timing signal INT. Therefore, when the timing signal T32 is input to the flip-flop 222, a set output Q1 is "1". In this case, since an output enable signal OE is input from the sorting circuit 11 to a NAND gate 228 through an inverter 229, a gate signal is output from the NAND gate 228 in accordance with this output enable signal OE. If the output enable signal OE is "0", the gate signal from the NAND gate 228 becomes "0", and the gate 221 is enabled. As a result, the data latched by the latch circuit 223 is output to the data bus 204 through the gate 221.

Note that if the data, which has undergone floating processing, is latched by the latch circuit 223, a status signal BFL0 representing this latched state is output to the sorting circuit 11. That is, this status signal BFL0 represents the completion of floating processing. As the status signal BFL0, a reset output Q2 from the flip-flop 222 is used, which is output to a status bus 232 through a gate 231. A gate signal from the gate 231 is controlled in accordance with the set output Q1 input from the flip-flop 222 through an inverter 230. If, therefore, the status signal BFL0 output to the status bus 232 is "0", sorting processing is started after the sorting circuit 11 outputs the output enable signal OE to the floating circuit 10, and the data latched by the latch circuit 223 is received.

Sorting processing in the sorting circuit 11 will be described below with reference to the flow chart shown in FIG. 5.

In step S1, if the status signal BFL0 is received, it is checked whether the status signal BFL0 is "0". If the status signal BFL0 is "0", it is determined that data to be sorted (similarity value SIM and character code CH) are latched by the latch circuit 223. In step S2, "0" is set in a register AR used as an accumulator. In addition, the similarity value SIM in the latch circuit 223 is loaded in a predetermined register in the sorting circuit 11. Furthermore, a BUSY signal representing that the sorting circuit 11 is being operated for sorting processing is set to be "1", logical OR operation between this BUSY signal and a BUSY signal from the timing controller 3 is performed, and an obtained BUSY signal is output to the host CPU through the interface 2.

A sorting candidate count code LSNO is supplied from the host CPU to the sorting circuit 11. Note that the sorting candidate count code LSNO has any one of values "0", "1", "2", and "3". In step S3, the value of the sorting candidate count code LSNO is determined.

If LSNO=3 is determined in step S3, a value "AR+7" is set in the register RA (step S4). In an initial state, "0" are respectively set in candidate registers L(0) to L(14).

In step S5, the similarity value SIM loaded in the predetermined register is compared with the value of a candidate register L(RA). If L(RA)>SIM is determined in step S5, a value "AR+8" is set in the register AR (step S6). Therefore, the similarity value SIM is set in one of the candidate registers L(8) to L(14).

In an initial state, since the value of each candidate register is "0", and L(RA)>SIM is determined in step S5, the value of the register AR is not updated. That is, the value of the register AR is "0". Therefore, the similarity value SIM is set in one of the candidate registers L(0) to L(6).

If LSNO=2 is determined in step S3, a value "AR+3" is set in the register RA (step S7). In step S8, the similarity value SIM loaded in the predetermined register is compared with the value of the candidate register L(RA). If L(RA)>SIM is determined in step S8, a value "AR+4" is set in the register AR (step S9).

If LSNO=1 is determined in step S3, a value "AR+1" is set in the register RA (step S10). In step S11, the similarity value SIM loaded in the predetermined register is compared with the value of the candidate register L(RA). If L(RA)>SIM is determined in step S11, a value "AR+2" is set in the register AR (step S12).

If LSNO=0 is determined in step S3, a value "AR+0" is set in the register RA (step S13). In step S14, the similarity value SIM loaded in the predetermined register is compared with the value of the candidate register L(RA). That is, the similarity value SIM is compared with the value of the candidate register L(0). If L(RA)>SIM is determined in step S14, a value "AR+1" is set in the register AR (step S15).

In step S16, the similarity value SIM is set in a predetermined candidate register corresponding to the value of the register AR.

With the above-described processing, one of the 15 candidate registers, in which the similarity value SIM is to be set, is determined. In an initial state, the similarity value SIM initially supplied from the sorting circuit 11 is set in the candidate register L(0) corresponding to the register AR=0. If the value of the sorting candidate count code LSNO from the host CPU is small, e.g., LSNO=0, sorting processing is completed after the contents of a candidate register are compared with the similarity value only once. If the similarity value SIM is set in a predetermined candidate register with the above-described processing, the values of the candidate registers subsequent to the candidate register in which the similarity value SIM is set are sequentially shifted. As a result, the similarity values SIM are sorted in the order of larger magnitudes.

Figure 5:
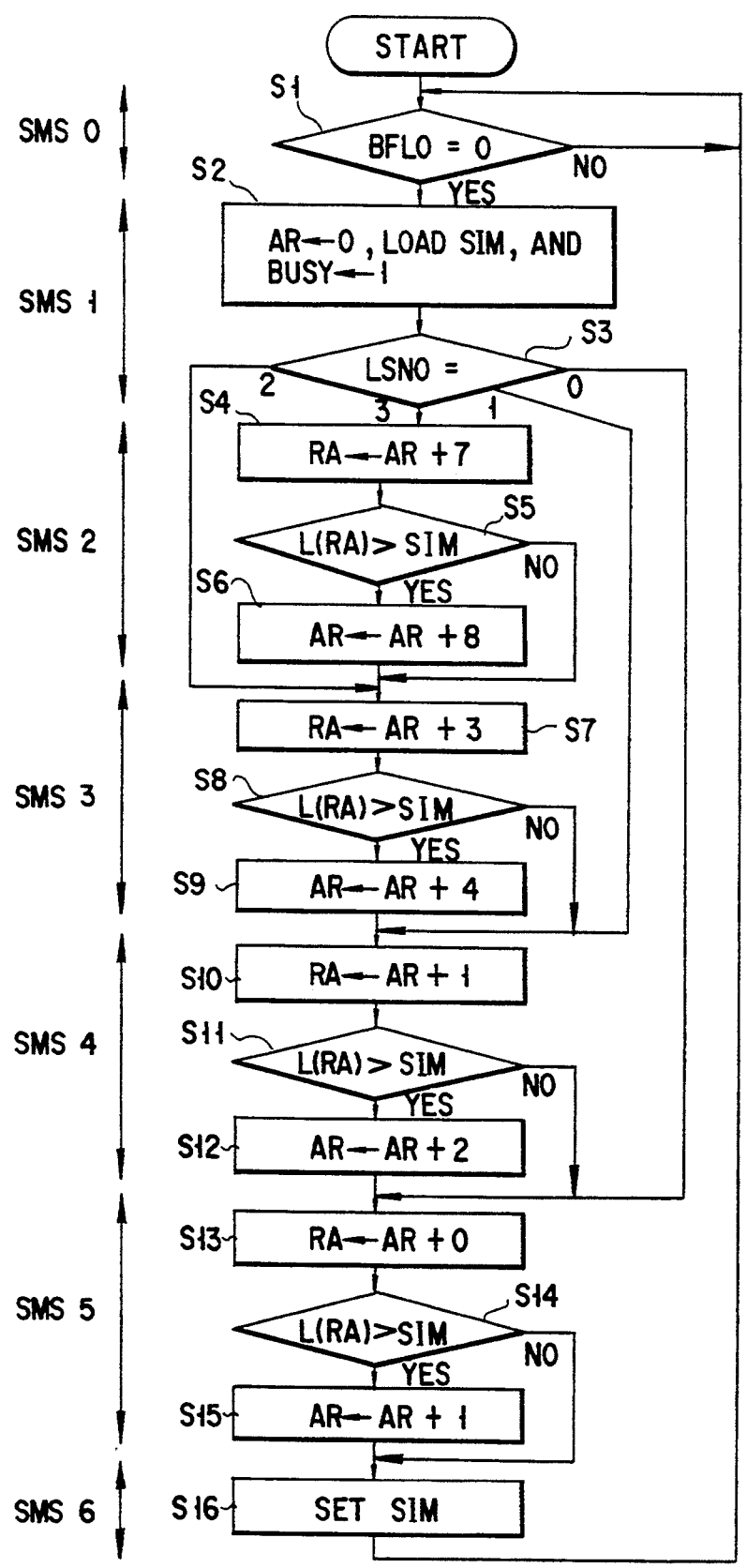
FIG. 5 is a flow chart showing sorting processing in a sorting circuit in FIG. 1.

Although the flow chart in FIG. 5 shows sorting processing with respect to the similarity values SIM, the character codes CH corresponding to the similarity values SIM are processed in the same manner.

FIGS. 6A and 6B are block diagrams showing the arrangement of the sorting circuit. The sorting candidate code LSNO supplied from the host CPU is loaded in a register 40 in response to a load signal. In addition, in order to initialize the sorting circuit 11, flip-flops 31 to 36 for controlling processing in phases SMS0 to SMS6 in the flow chart shown in FIG. 5 are reset, and only a flip-flop 30 is set, in response to the timing signal INT output from the timing controller 3. Note that the flip-flops 30 to 36 are connected to each other so as to latch data in response to the clock signal CP which is constantly supplied to the sorting circuit 11.

When the status signal BFL0 from the floating circuit 10 is input to an inverter 44, an output from the flip-flop 30 is supplied to the flip-flop 31 through a gate 45. With this operation, the similarity value SIM and the character code CH are respectively set in predetermined registers.

The sorting candidate count code LSNO loaded in the register 40 is input to a decoder 46 and its value is determined. As a result, a decode signal from the decoder 46 is supplied to one of the flip-flops 32, 33, 34, and 35 in accordance with the value (0, 1, 2, 3) of the sorting candidate count code LSNO.

If the decoder 46 determines that the value of the sorting candidate count code LSNO is "3", the decoder 46 outputs a decode signal "1" to the flip-flop 32 through an inverter 47. As a result, only the output of the flip-flop 32 becomes "1". This signal is input to the flip-flop 33 through a gate 48 and is sequentially input to the flip-flop 34 through a gate 49 and to the flip-flop 35 through a gate 50. That is, the state transition of the flip-flops is performed.

If the decoder 46 determines that the value of the sorting candidate count code LSNO is "0", a decode signal "1" from the decoder 46 is input to the flip-flop 35 through the gate 50.

As described above, different flip-flops are operated in accordance with the value of the sorting candidate count code LSNO supplied from the host CPU.

Note that if data to be sorted (similarity value SIM and corresponding character code CH) is supplied, sorting addresses are required to determine specific candidate registers, of the 16 candidate registers, in which the data are respectively set. These sorting addresses are set in an address register 51.

Outputs from the flip-flops 32, 33, 34, and 35 are supplied to the address register 51 through OR gates 52, 53, 54, and 55, respectively. Whether to set a sorting address in the address register 51 is determined in accordance with an output COMP from a comparator 74. In the phases SMS2 and SMS5 in FIG. 5, outputs from the flip-flops 32, 33, 34, and 35 are supplied to a gate 57 through a gate 58. With this operation, the period of each phase is determined.

An output from the address register 51 is supplied to the OR gates 52, 53, 54, and 55, and sorting addresses are cumulatively added in accordance with the output COMP from the comparator 74. A sorting address set in the address register 51 is used as an address of a ROM 59. Therefore, data stored in the ROM 59 is read out in accordance with a sorting address. Note that data stored in the ROM 59 is used to control the operation mode of each candidate register.

Outputs from the OR gates 52, 53, 54, and 55 are supplied to a decoder 60. As a result, an address of each register is designated in accordance with an output from the decoder 60, and the data set in each address-designated candidate register is input to the comparator 74.

FIG. 7 is a view for explaining the operation mode of each candidate register in a case wherein a new similarity value SIM is set in a predetermined candidate register in sorting processing. The operation mode of each candidate register includes a shift mode, a set disable mode, and an insertion mode. Note that positive logical data and negative logical data are stored in the ROM 59. The number of these data corresponds to the number of candidate registers and is set to be 15 in this case. In FIG. 5, the candidate registers L(0) to L(14) are used, whereas, in FIG. 6B, candidate registers 79, 80, 81, and 82 are used. Note that FIG. 6B shows only the four candidate registers 79, 80, 81, and 82 of the 15 candidate registers. "L(0)" corresponds to the uppermost candidate register 79 in which the maximum similarity value of the similarity values set in the 15 candidate registers is set, and is specified by candidate number 0. "L(14)" corresponds to the lowermost candidate register 82 in which the minimum similarity value is set, and is specified by candidate number 14.

If, for example, AR=5 is obtained with respect to the similarity value SIM to be sorted, the similarity value SIM is set in the candidate register L(5).

Positive logical data representing a state before the similarity value SIM is set in the candidate register L(5) is "1" for candidate numbers 0 to 4, and is "0" for candidate numbers 5 to 14. If the similarity value is set in the candidate register L(5), positive logical data at positions corresponding to candidate numbers 5 to 14 are respectively shifted to the right by one bit, and positive logical data "1" is inserted at the position corresponding to candidate number 5. Note that data loading operations with respect to candidate registers specified by candidate numbers corresponding to positive logical data "1" read out from the ROM 59 are inhibited, while data loading operations are performed with respect to only candidate registers specified by candidate numbers corresponding to positive logical data "0". The data loading operations include an input operation of setting the similarity value SIM in a predetermined candidate register, and a shift operation of sequentially shifting the similarity values set in candidate registers specified by candidate numbers lower than the candidate number of the predetermined candidate register.

When positive logical data "0" is shifted to the right by one bit, and positive logical data "1" is inserted at a position corresponding to a predetermined candidate number, negative logical data "1" from the ROM 59 represents that the similarity value SIM is set in the corresponding candidate register, and negative logical data "0" represents that the similarity values set in the candidate registers are sequentially shifted.

Outputs 61, 62, 63, and 64 from the decoder 60 are respectively supplied to gates 75, 76, 77, and 78. With this operation, the outputs of the candidate registers 79, 80, 81, and 82 are controlled. FIG. 6B shows only the four outputs 61, 62, 63, and 64 of the 15 outputs of the decoder 60, and only the four gates 75, 76, 77, and 78 of 15 gates to which outputs from the decoder 60 are supplied. Therefore, only the similarity value SIM set in a predetermined candidate register is output to a common bus 83 to be input to an input terminal B of the comparator 74. As described above, although the 15 candidate registers are arranged for the similarity value SIM, FIG. 6B shows only the four candidate registers. An input terminal A of the comparator 74 receives the similarity value SIM set in a register 86. Note that if the similarity value SIM input to the input terminal A of the comparator 74 is larger than the similarity value input to the input terminal B of the comparator 74, the output COMP from the comparator 74 becomes "0".

The similarity value SIM output from the floating circuit 10 is set in the register 86 in response to a sync signal LDSM. At the same time, the character code CH is set in a register 87. If the similarity value SIM set in the register 86 is larger than the similarity value which has been set in the candidate register, the similarity value SIM is set in the candidate register 79. The similarity value which has been set in the candidate register 79 is set in the candidate register 80 through a gate 89. In addition, the similarity value SIM set in the register 86 is also input to a gate 90. The output of the gate 90 is connected to the output of the gate 89. That is, data (similarity value) to be set in the candidate register 80 is determined by the gate 89 or 90. If the gate 89 is selected, the data set in the candidate register 79 is set in the candidate register 80. If the gate 90 is selected, the data set in the register 86 is set in the candidate register 80.

Note that a selection of the gates 89 and 90 is performed in accordance with logical data output from the ROM 59 to a line 70. If the logical data output to the line 70 is "0", the data set in the candidate register 79 is set in the candidate register 80. If the logical data output to the line 70 is "1", the data set in the register 86 is set in the candidate register 79.

The timings at which data are respectively set in the candidate registers 79, 80, 81, and 82 are controlled by signals obtained by inverting logical data respectively output from the ROM 59 to the lines 70, 71, 72, and 73, an output signal FF36 from the flip-flop 36, and outputs from AND gates 91, 92, 93, and 94 to which clock signals T are respectively input. Therefore, the similarity value SIM set in the register 86 or a similarity value shifted from another candidate register is set in the candidate registers 79, 80, 81, and 82. In addition, since no clock signal T is input to candidate registers higher than the candidate register in which the similarity value SIM in the register 86 is set, the contents of the upper candidate registers are not updated. For example, if the similarity value SIM in the register 86 is set in the candidate register 81, the candidate register 79 and 80 are upper candidate registers.

In the above-described manner, the maximum similarity value is set in the candidate register 79, and the minimum similarity value is set in the candidate register 82. In the first embodiment, the 15 candidate registers are arranged, and predetermined similarity values are set in the respective registers upon sorting processing.

The sorted similarity values are accessed in accordance with read addresses (RE ADR) from the host CPU. That is, the contents of the candidate registers 79, 80, 81, and 82 are output to the interface 2 through the common bus 83, a bus 99, and a gate 100 in accordance with the outputs 61, 62, 63, and 64, from the decoder 60, corresponding to these read addresses. Note that this read operation is performed after the similarity calculations for all the reference patterns to be recognized is completed and final sorting processing is executed. More specifically, a gate signal SBYO from a gate 67 to which the output Q of the flip-flop 30 and the status signal BFL0 are input is output to the interface 2. This gate signal SBYO is monitored by the host CPU, and a read operation is started in accordance with the gate signal SBYO.

The above description is associated with a sorting operation with respect to the similarity value SIM set in the register 86. Sorting is also required with respect to the character code CH corresponding to the similarity value SIM.

The character code CH output from the product-sum circuit 9 is set in the register 87 and is placed in dependence on the similarity value SIM set in the register 86. More specifically, the logical data output from the ROM 59 to the lines 70, 71, 72, and 73 are used to control candidate registers 101, 102, 103, and 104 with the same control operation as that for the candidate registers 79, 80, 81, and 82.

The sorted character codes are accessed in accordance with the read addresses (RE ADR) from the host CPU in the same manner as the read operation of the similarity values. That is, the contents of the candidate registers 101, 102, 103, and 104 are output to the interface 2 through a bus 105 and a gate 106 in accordance with the outputs 61, 62, 63, and 64, from the decoder 60, corresponding to the read addresses.

AS described above, according to the first embodiment, the similarity between an input pattern to be recognized and each reference pattern stored beforehand in the external memory can be calculated at high speed, and a circuit for executing such an operation can be reduced in size. In addition, even if an input pattern demanding high data precision as in recognition of kanji characters is given, a high-speed, practical pattern recognition apparatus can be realized. Furthermore, since the sorting circuit is arranged in the pattern recognition apparatus constituted by a one-chip LSI, the host CPU need not monitor the pattern recognition apparatus all the time but is only required to read out results obtained by the pattern recognition apparatus. Therefore, high-speed recognition can be achieved by arranging a plurality of pattern recognition apparatuses in parallel.

A pattern recognition apparatus according to the second embodiment of the present invention will be described next.

FIG. 8 is a block diagram showing the arrangement of the pattern recognition apparatus according to the second embodiment of the present invention. The pattern recognition apparatus shown in FIG. 8 is different from the pattern recognition apparatus 1 shown in FIG. 1 in that the similarities between one input pattern and a plurality of reference patterns are concurrently calculated, the respective calculation results are subjected to floating processing, and sorting processing is performed on the basis of the respective floating results. For this purpose, the pattern recognition apparatus shown in FIG. 8 further includes a latch circuit 201 for latching a reference pattern REF2, a product-sum circuit 202 for performing a product-sum calculation between the reference pattern REF2 latched by the latch circuit 201 and an input pattern latched by a latch circuit 6, and a floating circuit 203 for performing floating processing with respect to the product-sum result from the product-sum circuit 202.

The latch circuit 201, the product-sum circuit 202, and the floating circuit 203 are operated at the same timings as those of a latch circuit 4, a product-sum circuit 9, and a floating circuit 10. That is, the reference pattern REF2 is latched by the latch circuit 201, and a product-sum calculation between the reference pattern and the input pattern latched by the latch circuit 6 is performed by the product-sum circuit 202. The product-sum calculation result is subjected to floating processing in the floating circuit 203. The result obtained by the floating processing is output to a sorting circuit 11 through a bus 204 at a predetermined time. Note that sorting processing is performed by only the sorting circuit 11.

FIGS. 9A and 9B are block diagrams showing the arrangement of the floating circuit in FIG. 8. In comparison with the arrangement shown in FIG. 3A, the arrangement shown in FIG. 9A further includes a latch register 205 for latching a character code CH. Note that the floating circuits 10 and 203 have the same circuit arrangement.

A similarity value SIM and a corresponding character code CH latched by a latch register 27 and the latch register 205 are respectively latched by latch circuits 223 and 234 in response to a timing signal T32. The similarity value SIM and the character code CH latched by the latch circuits 223 and 224 are output to the data bus 204 through a gate 221. The similarity value SIM and the character code CH output to the data bus 204 are input to the sorting circuit 11. Note that the output of the gate 221 is controlled by an output Q1 of a flip-flop 222, a chain signal CI, and an output enable signal OE through a gate 228.

The flip-flop 222 is reset in response to a timing signal INT. When a timing signal T32 is input to the flip-flop 222, the output Q1 is set to be "1". If the output enable signal OE is input from the sorting circuit 11 to the NAND gate 228 through an inverter 229, a gate signal from the NAND gate 228 is determined in accordance with the output enable signal OE and the chain signal CI. If the output enable signal OE is "0", and the chain signal CI is "1", the gate signal from the NAND gate 228 becomes "0", and the gate 221 is enabled. As a result, the similarity value SIM and the character code CH latched by the latch circuits 223 and 224 are output to the data bus 204 through the gate 221.

Note that if the data, which has undergone floating processing, is latched by the latch circuit 223, a status signal BFL0 representing this latched state is output to the sorting circuit 11. As the status signal BFL0, an output Q2 from the flip-flop 222 is used, which is output to a status bus 232 through a gate 231. The output of the gate 231 is controlled by the output Q1 of the flip-flop 222 and the chain signal CI. Therefore, in the sorting circuit 11, if the status signal BFL0 output from the floating circuit 10 through a status bus 212 is "0", sorting processing is started after the output enable signal OE is output and the similarity value SIM and the character code CH latched by the latch circuits 223 and 224 are received.

If the plurality of floating circuits 10 and 203 are arranged as in the second embodiment, the chain signal CI from the floating circuit 10 is output to a line 250 to which a chain signal CO is input in the floating circuit 203.

As described above, according to the second embodiment, a plurality of similarity calculations are concurrently performed with respect to one input pattern, and the similarity calculation results are sorted. Therefore, the speed of calculations can be increased in accordance with the number of similarity calculations performed concurrently. In addition, during the time interval between the instant at which an input pattern is set in this pattern recognition apparatus and the instant at which sorting processing is completed, the host CPU need not be involved in the pattern recognition apparatus, and hence other processing, e.g., a preparation for setting the next input pattern, can be performed. Furthermore, in recognition processing with respect to various types of characters such as kanji characters, the processing can be performed at a practical speed.

Figure 10:
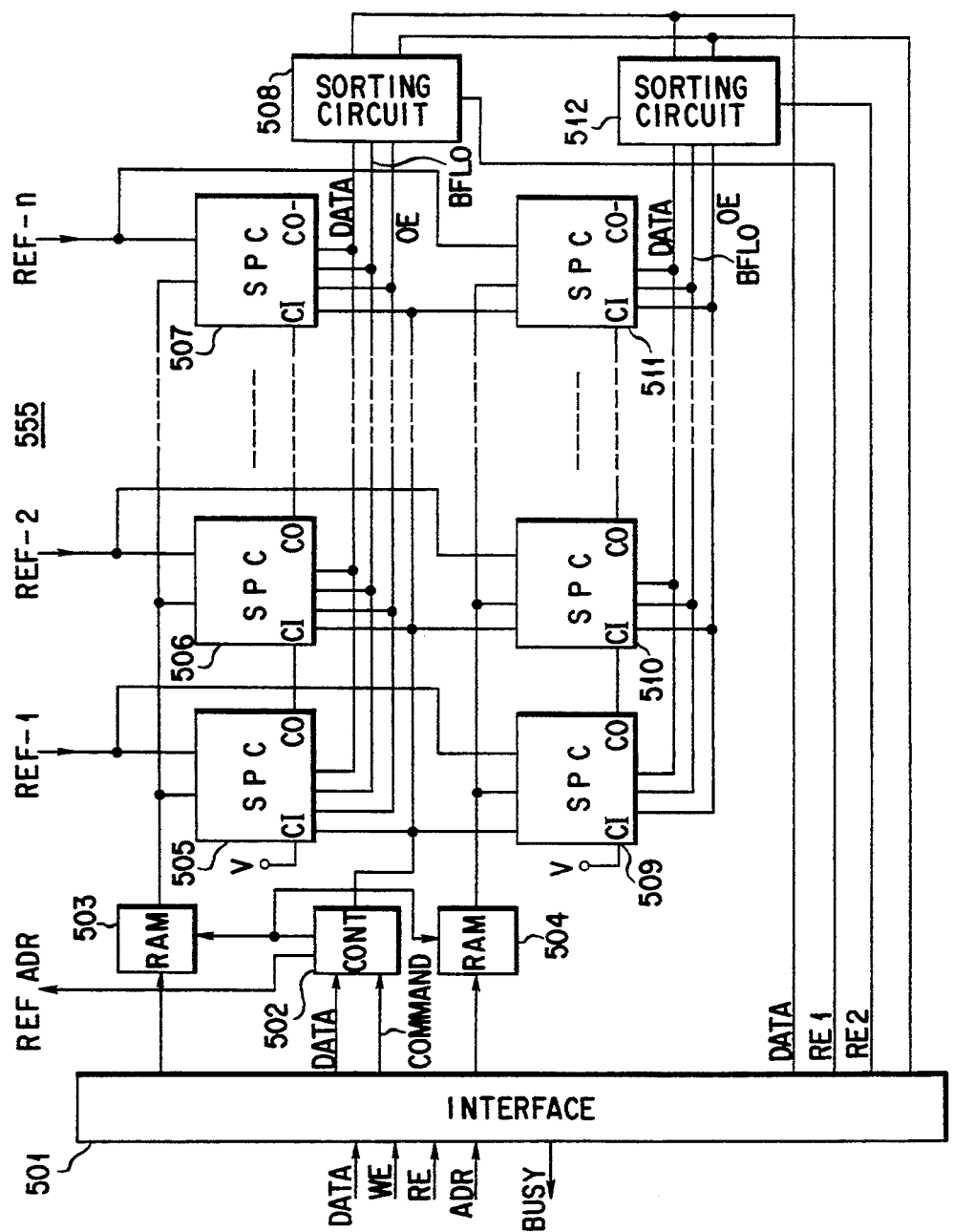
FIG. 10 is a block diagram showing the arrangement of a pattern recognition apparatus according to the third embodiment of the present invention.

FIG. 10 is a block diagram showing the arrangement of a pattern recognition apparatus according to the third embodiment of the present invention. In a pattern recognition apparatus 555 shown in FIG. 10, an interface 501 has standard data, address, and control buses and serves to transmit/receive data to/from a host CPU. RAMs (read only memories) 503 and 504 store input patterns to be recognized. Similarity calculating circuits (SPCs) 505, 506, 507, 509, 510, and 511 calculate the similarities between the input patterns stored in the RAM 503 and 504 and reference patterns stored beforehand in an external memory (not shown). A timing controller 502 controls the operation timings of the similarity calculating circuits 505, 506,507,509,510, and 511. In the third embodiment, similarity calculations of different input patterns respectively stored in the RAMs 503 and 504 are calculated by the similarity calculating circuits 505, 506, 507, 509, 510, and 511 by using reference patterns REF-1 to REF-n. Note that the calculation results obtained by the respective similarity calculating circuits are input to sorting circuits 508 and 512 in a predetermined order.

A read operation of the reference patterns REF-1 to REF-n stored in the external memory is controlled by a reference pattern address (REF ADR) output from the timing controller 502. In addition, a read operation of the input patterns stored in the RAMs 503 and 504 is controlled by a read address output from the timing controller 502 in synchronism with the reference pattern address REF ADR.

The sorting circuits 508 and 512 sort the calculation results obtained by the similarity calculating circuits 505, 506, 507, 509, 510, and 511. The results obtained by sorting are stored in registers in the sorting circuits 508 and 512, and are read out in response to read commands RE1 supplied from the host CPU through the interface 501.

FIG. 11 is a block diagram showing the arrangement of each similarity calculating circuit in FIG. 10. Referring to FIG. 11, registers 601 and 602 store an input pattern SPAT and a reference pattern REFP, respectively in synchronism with a timing signal T11 from the timing controller 502. Upon reception of an initialization signal TC2, which is initialized in units of categories or feature vectors of the reference pattern REFP, a product-sum circuit 604 is initialized. After the product-sum circuit 604 is initialized, the input pattern SPAT and the reference pattern REFP are input to the product-sum circuit 604 in synchronism with a timing signal T12 from the timing controller 502, and a product-sum calculation is performed between the two patterns. Note that this product-sum calculation is performed every time each pattern is changed. Product-sum data representing product-sum calculation results are output to a square-sum circuit 605 in units of categories or feature vectors. Thereafter, the product-sum circuit 604 is initialized in response to the initialization signal TC2 from the timing controller 502. The above-described operation is repeated a number of times corresponding to the number of reference patterns stored beforehand in the external memory.

After the square-sum circuit 605 is initialized upon reception of an initialization signal TC3 from the timing controller 502 for the first category of the reference pattern, product-sum data are input to the square-sum circuit 605 in units of feature vectors, and square-sum calculation with respect to the product-sum data is performed in synchronism with a timing signal T13 from the timing controller 502. After all the square-sum calculations in units of categories are completed, floating processing is performed to normalize square-sum data representing the square-sum calculation results. More specifically, the square-sum data are output to a floating circuit 606. Upon reception of an initialization signal TC4 output from the timing controller 502 for each category, the floating circuit 606 performs floating processing with respect to the square-sum data in response to a timing signal T14 from the timing controller 502.

After a product-sum calculation with respect to one category is completed, character and control codes corresponding to the reference pattern used for this product-sum calculation are stored in a register 603. The contents of the register 603 are loaded in the floating circuit 606 in response to a load signal TCH output from the timing controller 503. The results obtained by floating processing in the floating circuit 606 are input to the sorting circuits 508 and 512 in response to output enable signals OE from the sorting circuits 508 and 512. Note that this operation is performed provided that a chain signal CI input to the floating circuit 606 is at high level, and a status signal BFL0 is at low level.

The above-described processing is performed in accordance with a method of calculating a compound similarity. If an input pattern is represented by hi; a reference pattern, $\phi ij$; the number of input dimensions, i; a character category, k; and the number of feature vectors, j, a compound similarity Sk of the character category k is given by the following equation:

$$Sk = \sum_j (\sum_i hi\phi_{kij})^2 \qquad (1)$$

Note that a logical similarity value is normalized by the norm value of the input pattern hi. In this embodiment, however, this normalization is required for only several candidate similarity values obtained by sorting similarity values calculated according to equation (1).

Figure 12:
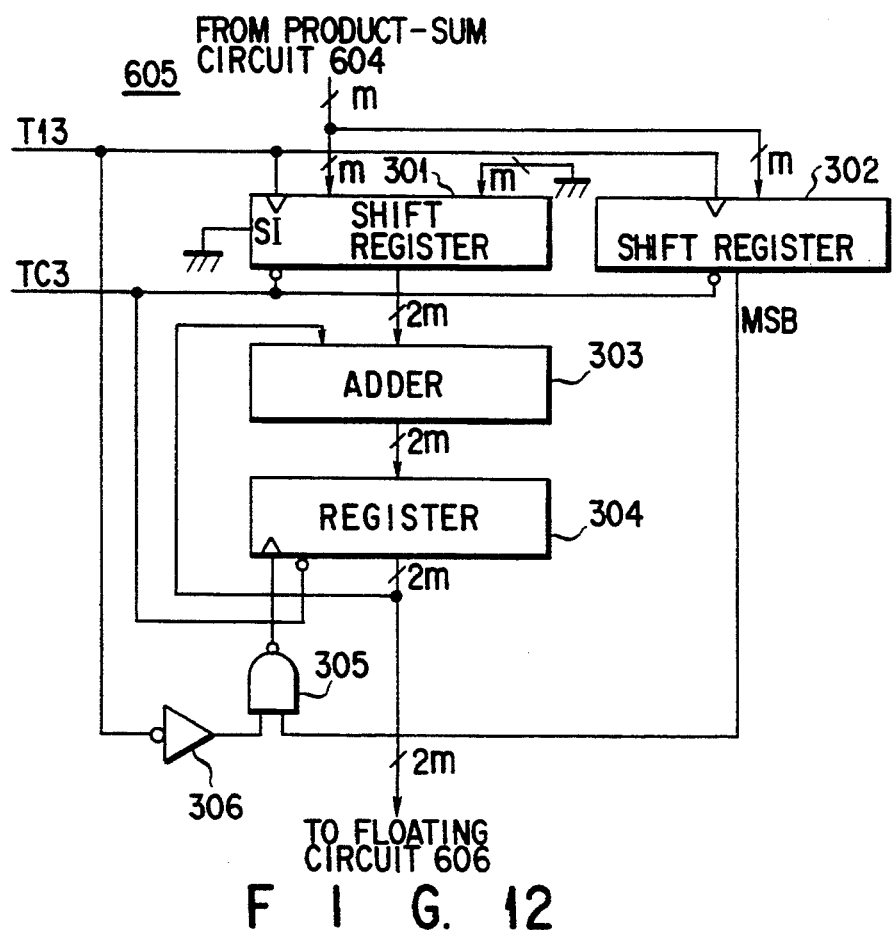
FIG. 12 is a block diagram showing the arrangement of a square-sum circuit, shown in FIG. 10, which is designed to perform processing based on equation (1)

FIG. 12 is a block diagram showing the arrangement of the square-sum circuit, shown in FIG. 10, which is designed to perform a square-sum calculation based on equation (1). Note that since it takes more time to perform a product-sum calculation as compared with a square-sum calculation, it is only required that a square-sum calculation be completed until a product-sum calculation of feature vectors is completed. Therefore, a square-sum calculation need not be performed at high speed, unlike a product-sum calculation.

Providing that the data length of the product-sum data output from the product-sum circuit 604, i.e., the product-sum data obtained in units of feature vectors in $hi\phi ij$ of equation (1), is represented by m, the product-sum data is input to upper m bits of a 2 m-bit right shift register 301. Note that an upper register shift input SI is at low level, and low-level data is input to lower m bits.

The MSB data of an m-bit left shift register 302 is used to determine the operation timing of a register 304 and is input to the sync input terminal of the register 304 through a NAND gate 305.

The 2 m-bit data output from the register 301 is input to one input terminal of an adder 303. The addition result obtained by the adder 303 is output to the register 304 in response to the timing signal T13. Since the timing signal T13 is repeatedly input to the sync input terminal of the register 304 by the number of times corresponding to the number of m-bit data, the 2 m-bit data, obtained when the MSB data of the register 302 is at high level, is set in the register 304. Therefore, square-sum calculations with respect to the product-sum data from the product-sum circuit 604 are completed by m shift operations. The square-sum data obtained by the square-sum calculations are output to the floating circuit 606. Square-sum calculations are performed in units of feature vectors by a number of times corresponding to the number of feature vectors. Note that the number of bits of product-sum data is adjusted so as not to set the register 304 in a full-bit state after one square-sum calculation.

FIG. 13 is a block diagram showing the arrangement of the floating circuit in FIG. 10. In response to the signal TC4 from the timing controller 502, square-sum data (similarity value SIM) output from the square-sum circuit 605 is set in a shift register 401. At the same time, a 4-bit exponent part counter 406 is initialized. The timing signal T14 generated after the timing signal TC4 and having 16 pulses is supplied, as a clock signal, to the exponent part counter 406 and the shift register 401. In response to this timing signal T14, the exponent part counter 406 starts a count-up operation, and the shift register 401 performs a left shift operation. The operation of the shift register 401 is completed when its MSB signal is at high level. The operation of the exponent part counter 406 is completed when a carry signal is output from its carry output terminal C. When the MSB signal or the carry signal is input to an OR gate 419, a gate signal is output from the OR gate 419 to an AND gate 403 through an inverter 405. In addition, the gate signal from the OR gate 419 is output to an enable input terminal E of the exponent part counter 406. As a result, the operations of the shift register 401 and the exponent part counter 406 are stopped. With the above-described operation, the upper-12-bit data of the 2 m-bit shift register 401 and data expressed by a ones complement of 4-bit data output from the exponent part counter 406 are respectively obtained as mantissa data and exponent data. These data represent the similarity value SIM obtained upon floating processing.

Note that when a signal representing the completion of floating processing is to be output, the following control is performed. A flip-flop 407 is reset in response to the timing signal INT which is output from the timing controller 3 immediately before an input pattern corresponding to one character is input to the pattern recognition apparatus 555. Thereafter, the timing signal T14, a carry signal output from the exponent part counter 406 in response to the timing signal T14, and an output Q from the flip-flop 407 are input to a NAND gate 408. A gate signal from the NAND gate 408 is input to the flip-flop 407 through a gate 409. That is, the flip-flop 407 is set up in response to the last pulse (16th pulse) of the 16 pulses of the timing signal T14.

When the chain signal CI is at high level, a gate 412 is controlled by an output Q from the flip-flop 407 through a NAND gate 413, and the status signal BFL0 is output to the sorting circuits 508 and 512. Note that this status signal BFL0 is used as a control signal common to all the similarity calculating circuits arranged in units of input patterns.

The chain signal CI from the similarity calculating circuit shown in FIG. 10 is fixed at high level all the time, and the chain signal CO from the similarity calculating circuit 505 is input, as the chain signal CI, to the similarity calculating circuit 506. In addition, the chain signal CI from the similarity calculating circuit 509 is also fixed at high level all the time, and the chain signal CO from the similarity calculating circuit 509 is input, as the chain signal CI, to the similarity calculating circuit 510. The chain signals CO are sequentially input, as the chain signals CI, to the subsequent similarity calculating circuits. As a result, the calculation results obtained by the similarity calculating circuits arranged in parallel are sequentially supplied to the sorting circuits 508 and 512.

Upon reception of the status signals BFL0, the sorting circuits 508 and 512 output the output enable signals OE to the similarity calculating circuits. The similarity value SIM and the corresponding character code CH, each constituted by 16-bit data, in the floating circuit 606 of each similarity calculating circuit are output to the sorting circuits 508 and 512 through a gate 420. Note that since the chain signal CI, the output enable signal OE, and the output Q from the flip-flop 407 are input to a NAND gate 410, the gate 420 is controlled by a gate signal from the gate 410. During the time interval in which the output enable signal OE is at low level, the similarity value SIM and the character code CH are output to the sorting circuits 508 and 512 through the gate 420. In addition, since an output signal from the NAND gate 410 is input to the flip-flop 407 through the gate 409 at the leading edge of the output enable signal OE, the output Q from the flip-flop 407 is set at low level, while the output Q is set at high level. The output is used as the chain signal CO.

The sorting circuits 508 and 512 have the same arrangement as that of the sorting circuit shown in FIGS. 6A and 6B. In addition, sorting processing is performed in the same manner as shown in the flow chart in FIG. 5.

Figure 14:
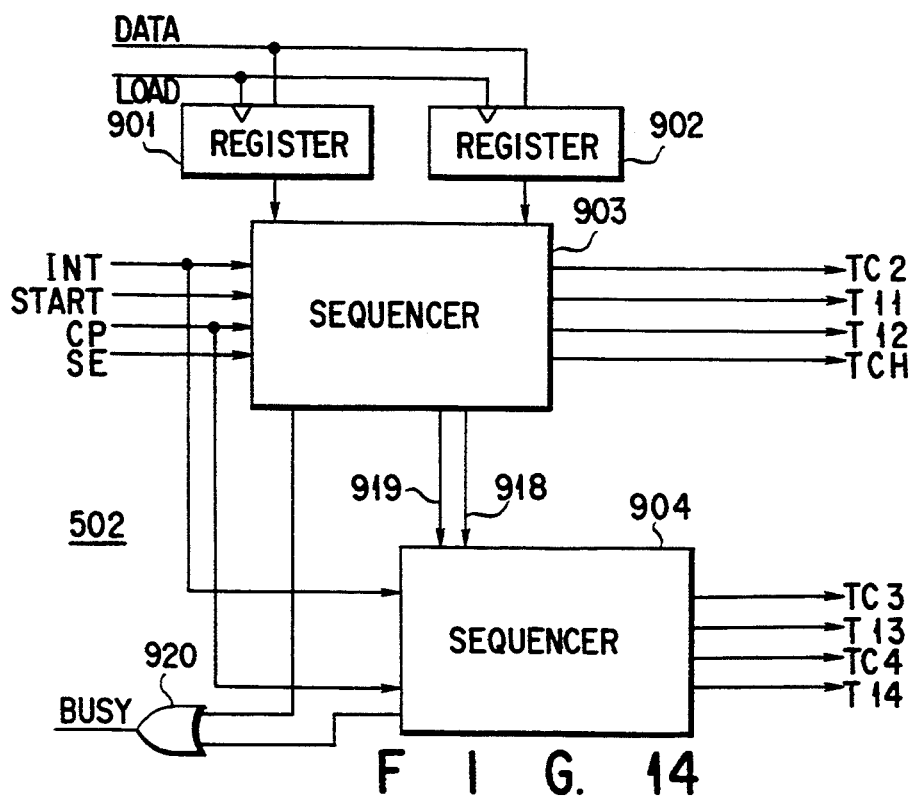
FIG. 14 is a block diagram showing the arrangement of a timing controller in FIG. 10.

Pipeline control of the respective similarity calculating circuits will be described below. FIG. 14 is a block diagram showing the arrangement of a timing controller.

Data representing the number of dimensions and data representing the number of feature vectors, which are used for a compound similarity calculation, are loaded from the host CPU into registers 901 and 902 in response to a load signal LOAD. These data are supplied to a sequencer 903. A clock signal CP is input to the sequencer 903 and a sequencer 904. In addition, the sequencers 903 and 904 are initialized in response to a timing signal INT as a command from the host CPU. When a processing start signal START as a command from the host CPU is input to the sequencer 903, the sequencer 903 sequentially outputs signals T11, T12, TC2, and TCH to the respective similarity calculating circuits (see FIG. 15). Simultaneously, the sequencer 903 outputs a BUSY signal through an OR gate 920 to the interface 2.

The number of dimensions for a compound similarity calculation is determined by the timing signal T12 having a plurality of pulses. The last pulse of the timing signal T12 is input to the sequencer 904 through a line 918. Upon reception of this last pulse, the sequencer 904 outputs signals TC3 and T13 to the product-sum circuits of the respective similarity calculating circuits at the timings shown in FIG. 15.

In addition, the sequencer 903 generates a control signal representing the last feature vector on the basis of the number of feature vectors in the compound similarity calculation, and outputs it to the sequencer 904 through a line 919. Upon reception of this control signal, the sequencer 904 outputs signals TC4 and T14 to the floating circuit of each similarity calculating circuit to perform floating processing with respect to each square-sum calculation result obtained in response to the timing signal T13. Simultaneously, the sequencer 904 outputs a BUSY signal through the OR gate 920 to the interface 2, as the sequencer 903.

In this manner, the sequencer 903 controls a product-sum calculation, and the sequencer 904 controls a square-sum calculation and floating processing. The sequencers 903 and 904 operate to perform pipeline processing therebetween.

Note that the operation of the sequencer 903 is completed upon reception of a signal SE. Data corresponding to the signal SE is stored in the external memory used as a dictionary, together with character codes stored in units of categories of a compound similarity, next to the last reference pattern, and is used as a control bit.

As described above, according to the third embodiment, since the compound similarities between one input pattern and a plurality of reference patterns can be concurrently calculated, sorting processing can be performed with respect to the calculation results. In addition, since a plurality of input pattern are concurrently input, a dictionary can be commonly used, and control of processing can be commonly performed. Therefore, similarity calculations in character recognition of various types of kanji characters or in spotting processing in speech recognition can be performed at a practical processing speed, and the hardware arrangement of a pattern recognition apparatus for performing such processing can be simplified.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A pattern recognition apparatus for recognizing an input pattern with respect to a plurality of reference patterns, comprising:

storage means for storing the input pattern data;

receiving means for receiving the plurality of reference pattern data;

similarity calculating means for calculating similarities between the input pattern data stored in the storing means and each of the reference pattern data received by the receiving means to acquire similarity values, the similarity calculating means including a plurality of product calculating circuits, each for calculating a corresponding product data based upon products of the input pattern data and a corresponding one of the reference pattern data and a plurality of sum calculating circuits, each for calculating a sum of the corresponding product data as a similarity value;

a floating operation circuit to floating-process the similarity values corresponding to the plurality of reference pattern data acquired by the similarity calculating means in an exponent indication; and sorting means for sorting the similarity values which have been floating-processed by the floating operation circuit in an order of magnitude of the similarity values so as to obtain a candidate pattern, wherein the sorting means comprises:

a first register for storing a selected one of the similarity values which has been floating-processed by the floating operation circuit;

a second register for storing the sorted similarity values, wherein the second register includes a plurality of memories which are capable of performing a data shifting operation;

comparing means for comparing the selected one of the similarity values stored in the first register with the sorted similarity values stored in the second register, and for selecting, based upon the order of similarity values already stored in the second register, one of the memories for storing the selected one of the similarity values stored in the first register; and control means for simultaneously shifting at least one of the sorted similarity values stored in the second register in accordance with order of similarity values already stored in the second register, causing the second register to store the similarity value compared by the comparing means in the selected one of the memories, and holding the sorted similarity value stored in the selected one of the memories in accordance with the comparison performed by the comparing means.

2. An apparatus according to claim 1, wherein the similarity calculating means further includes a plurality of square-sum calculating means having means for calculating square values based upon the sum obtained by each of the sum calculating circuits and means for calculating a sum of the square values.

3. An apparatus according to claim 2, wherein the apparatus further comprises second control means for controlling the product calculating circuits, the sum calculating circuits, the square-sum calculating means and the sorting means so as to perform pipeline processing of the product calculation, the sum calculation, the square-sum calculation and the sorting performed by the sorting means.

4. An apparatus according to claim 1, wherein said storage means, said similarity calculating means and said sorting means are mounted on a one-chip LSI.

5. An apparatus according to claim 1, wherein said sorting means includes means for limiting the number of candidate of the similarity values.

6. A pattern recognition apparatus for recognizing an input pattern with respect to a plurality of reference patterns, comprising:

storage means for storing the input pattern data;

receiving means for receiving the plurality of reference pattern data;

similarity calculating means for calculating similarities between the input pattern data stored in the storing means and each of the reference pattern data received by the receiving means to acquire similarity values, the similarity calculating means including product-sum calculating means having means for calculating products of the input pattern data and each of the reference pattern data and means for calculating a sum of the products as a similarity value;

floating operation means for floating-processing the similarity values corresponding to the plurality of reference pattern data acquired by the similarity calculating means in an exponent indication; and sorting means for sorting the similarity values which have been floating-processed by the floating operation means in an order of magnitude of the similarity values so as to obtain a candidate pattern, wherein the sorting means comprises:

a first register for storing a selected one of the similarity values which has been floating processed by the floating operation circuit;

a second register for storing the sorted similarity values, wherein the second register includes a plurality of memories which are capable of performing a data shifting operation;

comparing means for comparing the selected one of the similarity values stored in the first register with the sorted similarity values stored in the second register, and for selecting, based upon the order of similarity values already stored in the second register, one of the memories for storing the selected one of the similarity values stored in the first register; and control means for simultaneously shifting at least one of the sorted similarity values stored in the second register in accordance with order of similarity values already stored in the second register, causing the second register to store the similarity value compared by the comparing means in the selected one of the memories, and holding the sorted similarity value stored in the selected one of the memories in accordance with the comparison performed by the comparing means.

* * * * *